United States Patent [19]

Lucero

[11] 4,290,758

[45] Sep. 22, 1981

[54] TRAINING AID

[76] Inventor: Rohn Lee Lucero, P.O. Box 1794, Tuba City, Ariz. 86045

[21] Appl. No.: 75,213

[22] Filed: Sep. 13, 1979

[51] Int. Cl.³ ............................................. G09B 13/00
[52] U.S. Cl. .................................................. 434/227
[58] Field of Search ............. 35/5, 29 C, 29 D, 29 F, 35/36; 128/DIG. 23, 75, 76 R, 87 B, 89 A; 400/713, 714; 248/118; 434/227

[56] References Cited

U.S. PATENT DOCUMENTS

| | | | |
|---|---|---|---|
| 2,102,069 | 12/1937 | Hanicke | 128/75 X |
| 2,796,866 | 6/1957 | Cohen | 128/DIG. 23 X |
| 3,697,065 | 10/1972 | Glassburner | 128/DIG. 23 X |
| 3,957,040 | 5/1976 | Calabrese | 128/75 |

Primary Examiner—Harland S. Skogquist
Attorney, Agent, or Firm—Don J. Flickinger

[57] ABSTRACT

A U-shaped member is detachably engaged with the upper end of an elongate support member, the lower end of which embraces the shoulder of a student. The U-shaped member receives the back of the student's head and includes a forwardly extending leg to restrict movement of the head from a predetermined direction. The device prevents the student from observing his hands during the practice of manual dexterity exercises. The U-shaped member is pivotally movable for disengagement with the head.

6 Claims, 7 Drawing Figures

U.S. Patent    Sep. 22, 1981    4,290,758
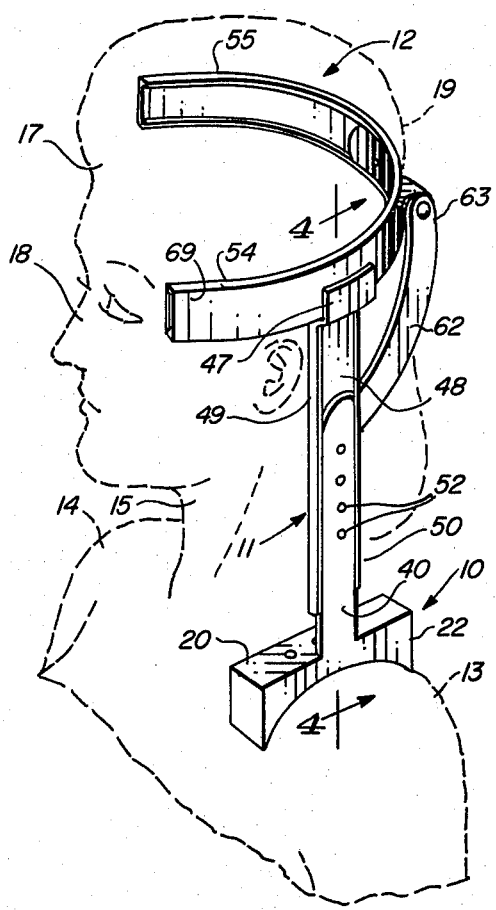
FIG-1
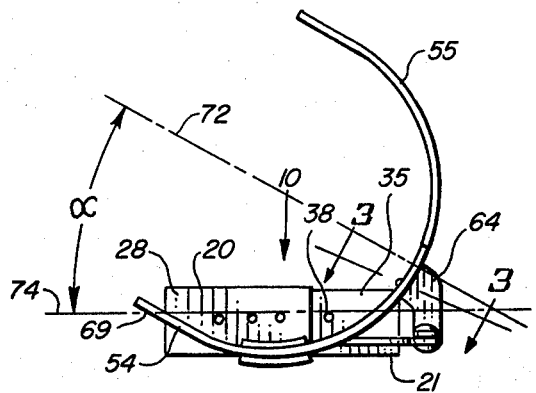
FIG-2
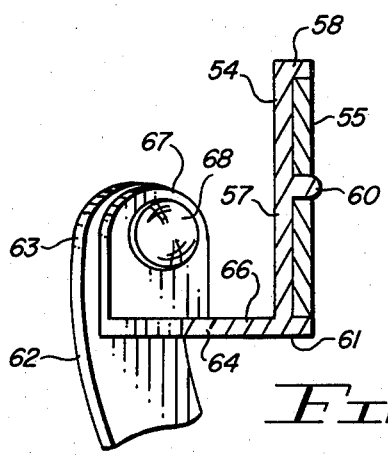
FIG-3
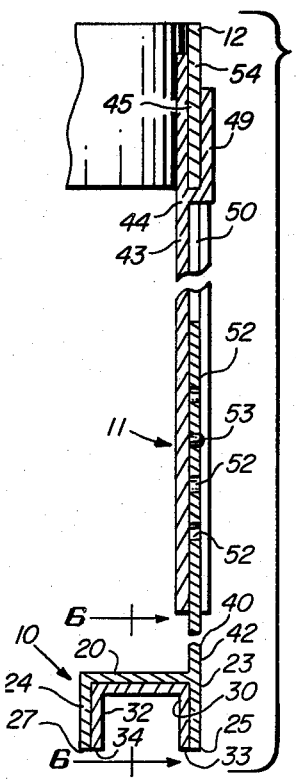
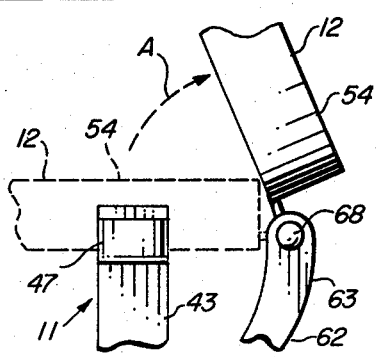
FIG-4
FIG-7
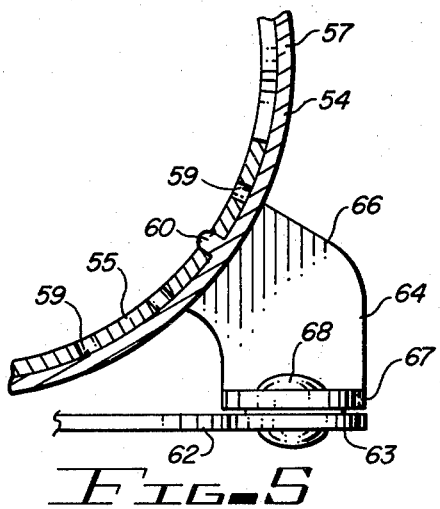
FIG-5
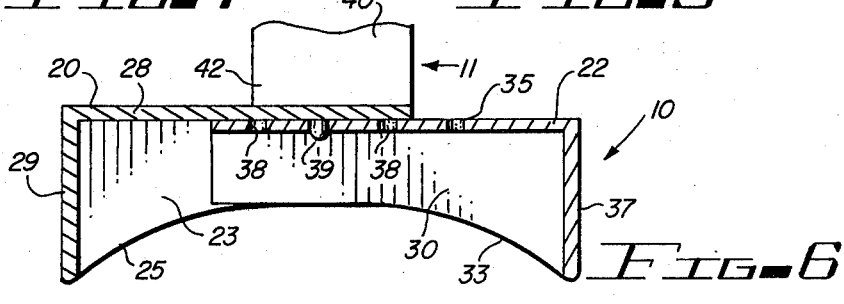
FIG-6

TRAINING AID

This invention relates to aids used during the teaching and training of students.

In a further aspect, the present invention relates to a training device for restricting movement of the human head.

More particularly, the instant invention concerns a training aid for directing a student's vision away from his hands during manual exercises.

For optimum performance, certain human activities require that a part of the body perform one activity while another part of the body is engaged in a second pursuit. In dancing, for example, to obtain maximum enjoyment, the partners tend to gaze into each other's faces, while the feet move unobserved. Similarly, the eyes of an efficient typist remain fixed upon the material to be transcribed while the unseen fingers dance upon the keyboard.

Just as the eyes of the novice dancer flits between the face of the partner and the clumsy feet, the eyes of the beginning typist continuously move between the material and the unsure fingers upon the keyboard. In either case, continuance of the practice results in development of undesireable habits which curtail efficiency and increase expended effort.

Patterns once formed, however, are not lightly altered. Undesireable habits are seldon broken. The typist with poor skills, born of incorrect procedures, will almost certainly never increase typing speed nor consider typing enjoyable.

Modern communication, as the result of the universal use of typewriters, computers and similar keyboard machines, is largely dependent upon a person having highly developed typing skills. As a practical matter, in inept are not competitive in the job market.

It is highly desireable, therefore, that typing students develop good skills and correct procedures from the beginning of training exercises. Usually, the material to be transcribed is held in an upright position to the left of the typing machine. The student sits squarely in front of the keyboard with the head tilted slightly to the left and eyes fixed upon the material. The fingers manipulate the keyboard exclusively by feel.

A search, conducted within the United States Patent and Trademark Office, to determine pertinent prior art revealed the following issued U.S. Pat. Nos.

3,177,869 Bartels
3,957,040 Calabrese
3,762,528 Garman
3,283,755 Harden
2,735,424 Benjamin
1,065,599 Elliott
2,102,069 Hanicke Bartels discloses a cervical neck brace having a chest plate and a back plate which are connected by a pair of spaced apart arcuate straps, one passing over each of the shoulders of the user. The brace further includes two head engaging members, a chin member and an occipital member, joined at respective ends by straps. A pair of posts extend between the chest plate and the chin member. A similar pair of posts extend between the back plate and the occipital member.

Benjamin discloses a cervical brace having a back plate and a chest plate joined by a pair of over-the-shoulder plates and a pair of under-the-arm chest straps. The device further includes a chin plate and an occipital plate. A front brace extends between the chest plate and the chin plate. A similar brace extends between the back plate and the occipital plate.

Calabrese discloses a cervical brace including a shoulder engaging portion having a pair of over-the-shoulder straps which are inner connected by front and rear straps. The device further includes a head engaging portion having a body provided with a concave recess for receiving the back of the head. Connected to the body is a member which extends across the forehead. A plurality of spaced pivotal mounts extend between the body engaging member and the head engaging member.

Elliott discloses a typewriter keyboard cover including an opaque cloth of sufficient size to cover a keyboard. Means are provided at one end of the cloth which are detachably securable to the frame of the typewriter. At the opposite end is a yoke shaped member which engages about the neck of the operator.

Garman discloses a typewriter shield having a support member extending upwardly from a base. A pair of pivotally interconnected screen members are pivotally connected to the upper end of the support member.

Hanicke discloses a cervical splint comprising a pair of body engaging members and a pair of head engaging members. Each of the members includes a rod-like member having a pad at either end. Each body engaging member stradles a respective shoulder. The respective ends of the body engaging members are connected by a front strap and rear strap. A head engaging member supported on either side of the head by a connecting member extending between respective rod-like members.

Harden discloses a reducing chin support having a frame which is supported by the shoulders. A chin strap is supported by the frame.

It is immediately apparent that none of the devices described in the above patents is suitable for the purpose previously described. It would be highly advantageous therefore to remedy the deficiencies of the prior art and provide a device especially adapted for use in connection with the teaching of typewriter skills.

Accordingly, it is an object of the present invention to provide a training aid for use in connection with the teaching of coordinated hand and eye skills.

Another object of the invention is the provision of a training aid especially adapted for use by students during practice exercise with keyboard type machines, such as typewriters.

And another object of the invention is to provide a training aid which will prohibit a student from observing his hands or the keyboard.

Still another object of the invention is the provision of a device which will keep the head of the student turned toward the material to be transcribed.

Yet another object of the invention is to provide a training aid which can be conveniently and comfortably worn by the student.

Yet still another object of the invention is the provision of a training aid which will not restrict nor interfer with the overall movements of the student.

And a further object of the instant invention is to provide a training aid which is readily adjustable to accommodate personal measurements.

Still a further object of the invention is the provision of a training aid which is selectively useable while being worn.

Yet a further object of the invention is to provide a device which is unencumbered and easily put on or taken off by the student.

And yet a further object of the invention is the provision of a training aid of the above type which is relatively durably constructed and comparatively economical to manufacture.

Briefly, to achive the desired objects of the instant invention in accordance with a preferred embodiment thereof, first provided is a shoulder engaging member which receives and bears upon the top of the student's shoulder. The lower end of an elongate upright support member is affixed to the shoulder engaging member. A generally U-shaped head engaging member which receives the back of the head is supported at the upper end of the head engaging member. Movement of the head of the student in a predetermined direction is restricted by an arm extending forwardly from the head engaging member.

In accordance with a further embodiment, the head engaging member is pivotally connected to an arm extending upwardly from the support member and is detachably supported by the support member. Accordingly, the head engaging member is movable between a first position in engagement with the head and a second position remote from the head. The shoulder engaging member, the head engaging member and the support member each include two sections which are adjustably movable for fitting to the student.

The foregoing and further and more specific objects and advantages of the instant invention will become readily apparent to those skilled in the art from the following detailed description of a preferred embodiment thereof taken in conjunction with the drawings in which;

FIG. 1 is a perspective view of a training aid constructed in accordance with the teachings of the instant invention as it would appear when attached to the human body, said body being shown in broken outline;

FIG. 2 is a top plan view of the training aid of FIG. 1;

FIG. 3 is an enlarged fragmentary vertical sectional view taken along the line 3—3 of FIG. 2;

FIG. 4 is an enlarged vertical sectional view taken along the line 4—4 of FIG. 1, sections there being broken away for purposes of illustration;

FIG. 5 is a top plan view of that portion of the device illustrated in FIG. 3, parts thereof being shown in section;

FIG. 6 is an enlarged fragmentary vertical sectional view taken along the line 6—6 of FIG. 4; and FIG. 7 is a fragmentary elevation view of the upper portion of the training aid of FIG. 1 as it would appear in an alternate position, the position of FIG. 1 being shown in broken outline.

Turning now to the drawings in which like reference characters indicate corresponding elements throughout the several views, attention is first directed to FIG. 1 which shows the training aid of the instant invention including a shoulder engaging member, an elongate upright support member and a generally U-shaped head engaging member generally designated by the reference characters 10, 11 and 12, respectively. For purposes of orientation, shown in broken outline is the upper portion of the student's body including left and right shoulders 13 and 14, respectively, neck 15 and head 17 having face 18 and back 19.

Shoulder engaging member 10, as further seen in FIGS. 2, 4 and 6 comprises first element 20 and second element 22. First element 20, being generally box-shaped, includes spaced apart sides 23 and 24 having lower edges 25 and 27, respectively, and joined by top 28 and end 29. Second elements 22, in general similarity to first element 20, includes spaced apart sides 30 and 32 having lower edges 33 and 34, respectively, and joined by top 35 and end 37. The outside dimensions of second element 22 generally coincide with the inside dimensions of first element 20 such that second element 22 is telescopingly movable within first element 20. A plurality of longitudinally spaced openings 38 extend through top 35 of second element 22. A projection 39 depends from top 28 of first element 20 in lateral alignment with openings 38. Projection 39 is sized to be snugly received by a selected opening 38.

As specifically seen in FIG. 6, the lower edge 25 of side 23 and the lower edge 33 of side 30 are curved and taken together define a generally arcuate shape which approximates the natural curve of the top of the human shoulder as seen with reference to FIG. 1. Although not specifically illustrated, lower edge 27 of side 24 and lower edge 34 of side 31 are correspondingly shaped. It is noted that the top of the human shoulder is generally convex while the underside of shoulder engaging member 10 is generally concave. Second element 22 being telescopingly adjustable relative first element 20 accommodates differently sized shoulders, i.e., shoulders having a greater front to rear thickness. Projection 39 cooperates with each opening 38 to provide interlocking means for holding the elements 20 and 22 at a selected size.

With particular reference to FIGS. 1 and 4, it is seen that upright support member 11, being generally elongated, includes lower section 40 having lower end 42 which is integral with first element 20 of shoulder engaging member 10 and an upper section 43 having an upper end 44. Upper end 44 of upper section 43 is bifurcated having spaced apart upstanding furcations 45 and 47.

Upper section 43 is generally U-shaped in cross-section having central element 48 with upstanding longitudinally edge portions 49 and 50 which form a channel for slidably receiving lower section 40. A plurality of longitudinally spaced openings 52 extend through lower section 40. A projection 53 extends from central element 48 of upper section 43 and is receivable within any seiected opening 52. Accordingly, the height of upright support member 11 is adjustably variable.

Similar to shoulder engaging member 10 and upright support member 11, head engaging member 12 includes first and second telescopingly adjustable sections 54 and 55, respectively. First section 54 is generally U-shaped in cross-section having a central element 57 and upstanding edge portions 58 and 61 which form a channel for slidably receiving second section 55. A plurality of longitudinally spaced apart openings 59 extend through second section 55. A projection 60 extending from central element 57 is receivable, in snap engagement, within a selected opening 59. Accordingly, the size of head engaging member 12 is adjustable.

Arm 62 extends upwardly from upper section 43 of support member 11 and terminates with upper free end 63, as illustrated in FIG. 1. An angular bracket 64, as viewed in FIGS. 3 and 5 and including first leg 66 and second leg 67, extends rearwardly from first section 54 of head engaging member 12. The upper free end 63 of arm 62 is pivotably secured to second leg 67 of bracket 64 by rivet 68. Bifurcated end 44 of upright support member 11 forms a receptacle for receiving, supporting and stablizing head engaging member 12. In the position of FIG. 1, as seen in broken outline in FIG. 7, first section 54 is received between furcation 45 and 47. Head engaging member 12 is pivotably movable in the direction of arrowed line A to a second position as illustrated in solid outline.

With respect to FIGS. 1 and 2, it is seen that U-shaped head engaging member 12 has an axis of symmetry 72 which is rotated, or turned, through an angle oc with respect to the longitudinal axis 74 of shoulder engaging member 10. As a result, when the head 17 of a student, for example, is received, or placed, in member 12 with the back portion 19 of the head in substantial contact with the interior of member 12, head 18 is turned through an angle substantially equal to oc when both axes 72 and 74 are projected normally onto a horizontal plane.

In preparation for use, first and second elements 20 and 22 of shoulder engaging member 10 are adjusted for a snug but comforatable fit over shoulder 13. Then, with element 54 of head engaging member 12 within the receptacle formed by furcations 45 and 47, upper and lower sections 43 and 44, respectively, of support member 11 are adjusted such that section 54 is the elevation of the temple above the ear. Subsequently first and second sections 54 and 55 of head engaging member 12 are adjusted for a snug but comforatable fit about the back of the head. The particular model illustrated in FIG. 1 is left handed with arm 69 extending forwardly along the left temple thereby holding the student's head rotated to the right and restricting movement to the left. As will be readily apparent to those skilled in the art, a right handed model, utilizing mirror image components, can be readily fabricated.

The training aid of the instant invention automatically directs the student's vision to the material to be transcribed which is placed to the side of the typewriter or other keyboard machines. The device further restricts movement of the head, and concurrently vision, toward the keyboard or fingers. For brief pauses, head engaging member 12 can be pivotably lifted as seen in FIG. 7 removing arm 69 from the temple area and allowing movement of the student's head. Once adjustments are made, the student can quickly and easily remove the unencumbered device for rest periods and similarly, quickly, and easily return to using the device without further adjustments.

Various changes to the device herein chosen for purposes of illustration will readily occur to those skilled in the art. For example, the device may be constructed without arm 62, relying solely upon the upper end of the support member for holding the head engaging member. Similarly, it will be appreciated that while it is preferred that the device be made of a substantially rigid plastic, other suitable materials are known, such as metal including aluminum. To the extent that such modifications and variations do not depart from the spirit of the invention, they are intended to be included within the scope thereof which is assessed only by a fair interpretation of the following claims.

Having fully described and disclosed the invention and a presently preferred embodiment thereof in such clear and concise terms as to enable those skilled in the art to understand and practice the same.

The invention claimed is:

1. A training aid for engaging the shoulder of a student and for turning the head of the student in a predetermined direction relative to the shoulder of the student, said training aid comprising:
  a. a shoulder engaging member for receiving and bearing only upon one shoulder of said student, said shoulder engaging member having a longitudinal axis;
  b. a generally U-shaped head engaging member for receiving the back of the head, said head engaging member having an axis of symmetry;
  c. an elongate substantially upright support member having,
    i. a lower portion immovably affixed to said shoulder engaging member, and
    ii. an upper portion supporting said head engaging member above the ears of said head; and
  d. bracket means for securing the head engaging member to the upper portion of the upright support member so that the axis of symmetry of the head engaging member is at an angle oc with respect to the longitudinal axis of the shoulder engaging member.

2. The training aid of claim 1, wherein said shoulder engaging member further includes:
  a. a first element having a lower end of said support member affixed thereto;
  b. a second element telescopingly extendable and retractable relative said first element; and
  c. interlocking means for holding said second element at selective positions relative said first element.

3. The training aid of claim 2 in which the bracket means pivotally connects said head engaging member to the upper portion of the support member, whereby said head engaging member is pivotally movable between a first position in which said head engaging member is in direct contact with said upright support member, and a second position in which said head engaging member is not in direct contact with said upright support member.

4. The training aid of claim 3, further including a bifurcated receptacle carried at the upper free end of said support member for receiving and holding said head engaging member in said first position.

5. The training aid of claim 3, wherein said elongate upright support member further includes means for adjustably positioning the upper portion relative to the lower portion of the support member for selectively varying the elevation of said head engaging member above said shoulder engaging member.

6. The training aid of claim 5, wherein said head engaging member includes:
  a. a first section; and
  b. a second section adjustably movable relative to said first section.

* * * * *